United States Patent
Day et al.

(10) Patent No.: US 7,440,935 B2
(45) Date of Patent: Oct. 21, 2008

(54) METHOD AND SYSTEM FOR QUERY DIRECTIVES AND ACCESS PLAN HINTS

(75) Inventors: Paul Reuben Day, Rochester, MN (US); Brian Robert Muras, Rochester, MN (US); Anne Marie Ryg, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 10/839,487

(22) Filed: May 5, 2004

(65) Prior Publication Data

US 2005/0262046 A1    Nov. 24, 2005

(51) Int. Cl.
    *G06F 7/00* (2006.01)
(52) U.S. Cl. .............................. 707/2; 707/4
(58) Field of Classification Search ............... 707/1, 707/2, 3, 4, 102, 101, 100
    See application file for complete search history.

(56) References Cited

U.S. PATENT DOCUMENTS

| | | | | |
|---|---|---|---|---|
| 5,335,345 | A * | 8/1994 | Frieder et al. ................ | 707/5 |
| 5,600,831 | A * | 2/1997 | Levy et al. ................... | 707/2 |
| 5,822,748 | A * | 10/1998 | Cohen et al. ................. | 707/2 |
| 6,353,826 | B1 * | 3/2002 | Seputis ........................ | 707/5 |
| 6,516,310 | B2 * | 2/2003 | Paulley ........................ | 707/2 |
| 6,754,652 | B2 * | 6/2004 | Bestgen et al. .............. | 707/3 |
| 6,813,617 | B2 * | 11/2004 | Wong et al. ................... | 707/4 |
| 7,031,958 | B2 * | 4/2006 | Santosuosso ................ | 707/3 |
| 7,308,437 | B2 * | 12/2007 | Day et al. ..................... | 707/2 |
| 2003/0078909 | A1 * | 4/2003 | Pham et al. .................. | 707/1 |
| 2003/0200204 | A1 * | 10/2003 | Limoges et al. ............. | 707/3 |
| 2004/0006561 | A1 * | 1/2004 | Nica ............................ | 707/3 |
| 2004/0220923 | A1 * | 11/2004 | Nica ............................ | 707/3 |

OTHER PUBLICATIONS

Ambite et al., Flexible and Scalable Query Access Planning Using an AI Planner, Knowledgement and Database Engineering Exchange Workshop, 1997. Proceddings, Nov. 4, 1997, pp. 132-139.*

Ng et al., On Reconfiguring Query Execution Plans in Distributed Object-Relational DBMS, Parallel and Distributed Systems, 1998. Proceedings., 1998 International Conference on, Dec. 14-16, 1998, pp. 59-66, Digital Object Identifier 10.1109/ICPADS.1998.741020.*

* cited by examiner

*Primary Examiner*—Greta L Robinson
(74) *Attorney, Agent, or Firm*—Wood, Herron & Evans, LLP

(57) ABSTRACT

A query plan modification system and method relates to a database system that includes a cost-based optimizer for generating access plans. The database system also permits a user to view an access plan that has been generated by a particular SQL query and modify the access plan if desired. The user specifies customizations that are associated with the access plan so that when that plan is executed, the customizations are executed as well. Exemplary customizations include specifying an initialization file specific to a query, specifying different implementation methods than those in the original access plan, prohibiting rebuilding of an access plan, and over-riding or ignoring a clause within the query that is used to generate the access plan.

9 Claims, 2 Drawing Sheets

METHOD AND SYSTEM FOR QUERY DIRECTIVES AND ACCESS PLAN HINTS

FIELD OF THE INVENTION

The invention relates to database management systems, and in particular, to modifying automatically generated access plans.

BACKGROUND OF THE INVENTION

Databases are used to store information for an innumerable number of applications, including various commercial, industrial, technical, scientific and educational applications. As the reliance on information increases, both the volume of information stored in most databases, as well as the number of users wishing to access that information, likewise increases. Moreover, as the volume of information in a database, and the number of users wishing to access the database, increases, the amount of computing resources required to manage such a database increases as well.

Database management systems (DBMS's), which are the computer programs that are used to access the information stored in databases, therefore often require tremendous resources to handle the heavy workloads placed on such systems. As such, significant resources have been devoted to increasing the performance of database management systems with respect to processing searches, or queries, to databases.

Improvements to both computer hardware and software have improved the capacities of conventional database management systems. For example, in the hardware realm, increases in microprocessor performance, coupled with improved memory management systems, have improved the number of queries that a particular microprocessor can perform in a given unit of time. Furthermore, the use of multiple microprocessors and/or multiple networked computers has further increased the capacities of many database management systems.

From a software standpoint, the use of relational databases, which organize information into formally-defined tables consisting of rows and columns, and which are typically accessed using a standardized language such as Structured Query Language (SQL), has substantially improved processing efficiency, as well as substantially simplified the creation, organization, and extension of information within a database. Furthermore, significant development efforts have been directed toward query "optimization", whereby the execution of particular searches, or queries, is optimized in an automated manner to minimize the amount of resources required to execute each query.

Through the incorporation of various hardware and software improvements, many high performance database management systems are able to handle hundreds or even thousands of queries each second, even on databases containing millions or billions of records. However, further increases in information volume and workload are inevitable, so continued advancements in database management systems are still required.

Presently, there are cost-based query optimizers and rule-based query optimizers. In a rule-based environment, a user, such as a skilled database administrator, explicitly defines a number of rules of how to generate an access plan from an SQL statement. These rules, for example, can relate to creating or using indices or can relate to how JOIN statements are performed. The rule-based optimizer applies the rules as specified by the user to generate an access plan in accordance with the rules. The performance of the resulting access plan is determined by the skill of the user specifying the rules.

A cost-based optimizer includes information of the many alternative ways that an exemplary SQL statement can be converted into an access plan. An estimate is generated for each such alternative plan as to its anticipated performance "cost". The cost-based optimizer attempts to identify the access plan having the lowest cost. One area that has been a fertile area for academic and corporate research is that of improving the designs of the cost-based "query optimizers" utilized in many conventional database management systems. As stated, the primary task of a query optimizer is to choose the most efficient way to execute each database query, or request, passed to the database management system by a user. The output of an optimization process is typically referred to as an "execution plan," "access plan," or just "plan" and is frequently depicted as a tree graph. Such a plan typically incorporates (often in a proprietary form unique to each optimizer/DBMS) low-level information telling the database engine that ultimately handles a query precisely what steps to take (and in what order) to execute the query. Also typically associated with each generated plan is an optimizer's estimate of how long it will take to run the query using that plan.

A cost-based optimizer's job is often necessary and difficult because of the enormous number (i.e., "countably infinite" number) of possible query forms that can be generated in a database management system, e.g., due to factors such as the use of SQL queries with any number of relational tables made up of countless data columns of various types, the theoretically infinite number of methods of accessing the actual data records from each table referenced (e.g., using an index, a hash table, etc.), the possible combinations of those methods of access among all the tables referenced, etc. A cost-based optimizer is often permitted to rewrite a query (or portion of it) into any equivalent form, and since for any given query there are typically many equivalent forms, an optimizer has a countably infinite universe of extremely diverse possible solutions (plans) to consider. On the other hand, an optimizer is often required to use minimal system resources given the desirability for high throughput. As such, a cost-based optimizer often has only a limited amount of time to pare the search space of possible execution plans down to an optimal plan for a particular query.

Typical cost-based optimizers store information about previously encountered queries and the access plans that were created for such queries. When a previous query is once again encountered, these optimizers use previous access plans to avoid the time and cost of re-creating an access plan. However, even if a similar query is used, there may be different needs or requirements for the data being retrieved. Current cost-based optimizers, therefore, produce the same access plan for all users and do not permit the access plans to be modified or customized. Thus, there remains the need in prior database environments for a system that permits customization of an access plan generated by a cost-based optimizer.

SUMMARY OF THE INVENTION

Embodiments of the present invention relate to a database system that includes a cost-based optimizer for generating access plans. The database system also permits a user, typically a system administrator, to view an access plan that has been generated by a particular SQL query and modify the access plan if desired. The user specifies customizations that are associated with the access plan so that when that plan is executed, the customizations are executed as well. Exemplary customizations include specifying an initialization file specific to a query, specifying different implementation methods than those in the original access plan, prohibiting rebuilding of an access plan, and over-riding or ignoring a clause within the query that is used to generate the access plan.

One aspect of the present invention relates to a method for modifying an access plan. In accordance with this aspect, one or more user preferences are received relating to the access plan that was generated using a cost-based optimizer. Also, the one or more user preferences are associated with the access plan, and the access plan and the associated one or more user preferences are stored together. In particular, the access plan is an object and by storing the two together, the associated one or more user preferences are incorporated within the object.

Another aspect of the present invention relates to a method for executing an access plan that involves receiving the access plan that was generated using a cost-based optimizer and receiving a set of user preferences associated with the access plan. The set of user preferences are applied to the access plan to generate a modified access plan, and the modified access plan is executed.

DETAILED DESCRIPTION

As mentioned above, the embodiments discussed hereinafter utilize a database engine and optimizer framework that support customizing an access plan, or query plan, generated by a cost-based optimizer according to user preferences supplied by a user. Once the query plan is generated or retrieved, a user is permitted to revise the query plan, by providing a number of user preferences, in order to customize its execution before the query plan is passed to the execution engine. The new query plan is then executed along with its customizations. A specific implementation of such a database engine and optimizer framework capable of supporting this functionality in a manner consistent with the invention will be discussed in greater detail below. However, prior to a discussion of such a specific implementation, a brief discussion will be provided regarding an exemplary hardware and software environment within which such an optimizer framework may reside.

Figure 1:
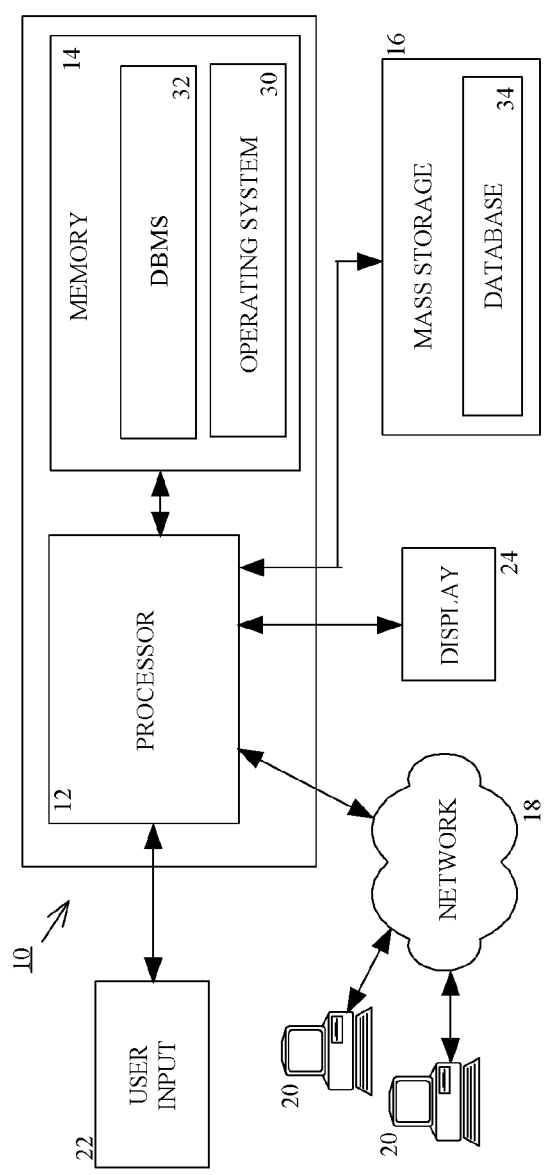
FIG. 1 is a block diagram of a networked computer system incorporating a database management system consistent with the invention.

Turning now to the Drawings, wherein like numbers denote like parts throughout the several views, FIG. 1 illustrates an exemplary hardware and software environment for an apparatus 10 suitable for implementing a database management system that permits users to customize access plans consistent with the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer", although it should be appreciated the term "apparatus" may also include other suitable programmable electronic devices consistent with the invention.

Computer 10 typically includes at least one processor 12 coupled to a memory 14. Processor 12 may represent one or more processors (e.g., microprocessors), and memory 14 may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor 12, as well as any storage capacity used as a virtual memory, e.g., as stored on a mass storage device 16 or on another computer coupled to computer 10 via network 18 (e.g., a client computer 20).

Computer 10 also typically receives a number of inputs and outputs for communicating information externally. For interface with a user or operator, computer 10 typically includes one or more user input devices 22 (e.g., a keyboard, a mouse, a trackball, a joystick, a touchpad, and/or a microphone, among others) and a display 24 (e.g., a CRT monitor, an LCD display panel, and/or a speaker, among others). Otherwise, user input may be received via another computer (e.g., a computer 20) interfaced with computer 10 over network 18, or via a dedicated workstation interface or the like.

For additional storage, computer 10 may also include one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may include an interface with one or more networks 18 (e.g., a LAN, a WAN, a wireless network, and/or the Internet, among others) to permit the communication of information with other computers coupled to the network. It should be appreciated that computer 10 typically includes suitable analog and/or digital interfaces between processor 12 and each of components 14, 16, 18, 22 and 24 as is well known in the art.

Computer 10 operates under the control of an operating system 30, and executes or otherwise relies upon various computer software applications, components, programs, objects, modules, data structures, etc. (e.g., database management system 32 and database 34, among others). Moreover, various applications, components, programs, objects, modules, etc. may also execute on one or more processors in another computer coupled to computer 10 via a network 18, e.g., in a distributed or client-server computing environment, whereby the processing required to implement the functions of a computer program may be allocated to multiple computers over a network.

Figure 2:
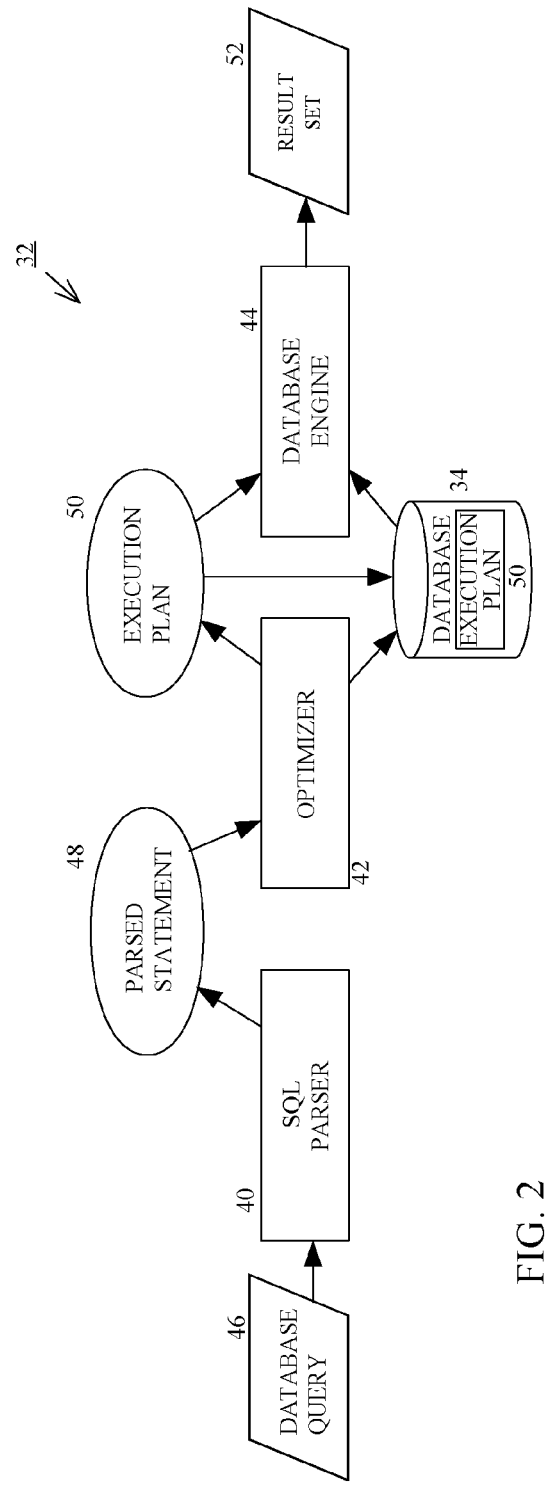
FIG. 2 is a block diagram illustrating the principal components and flow of information therebetween in the database management system of FIG. 1.

Turning briefly to FIG. 2, an exemplary implementation of database management system 32 is shown. The principal components of database management system 32 that are relevant to query optimization are an SQL parser 40, cost-based optimizer 42 and database engine 44. SQL parser 40 receives from a user a database query 46, which in the illustrated embodiment, is provided in the form of an SQL statement. SQL parser 40 then generates a parsed statement 48 therefrom, which is passed to optimizer 42 for query optimization. As a result of query optimization, an execution or access plan 50 is generated, often using data such as platform capabilities, query content information, etc., that is stored in database 34. Once generated, the execution plan is forwarded to database engine 44 for execution of the database query on the information in database 34. The result of the execution of the database query is typically stored in a result set, as represented at block 52.

Other components may be incorporated into system 32, as may other suitable database management architectures. Other database programming and organizational architectures may also be used consistent with the invention. Therefore, the invention is not limited to the particular implementation discussed herein.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIGS. 1 and 2 is not intended to limit the present invention. Indeed, those skilled in the art will recognize that other alternative hardware and/or software environments may be used without departing from the scope of the invention.

Figure 3:
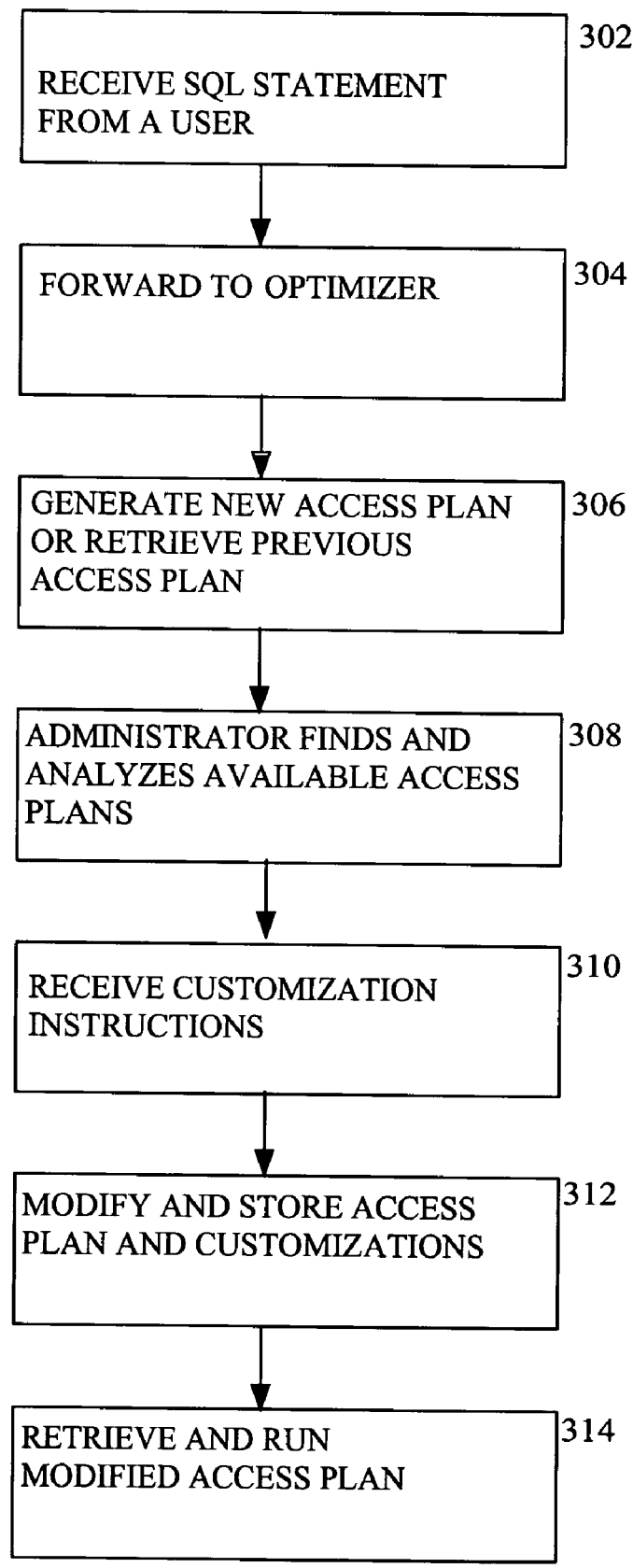
FIG. 3 illustrates a flowchart of displaying an access plan to a user and receiving customization instructions according to embodiments of the present invention.

FIG. 3 illustrates a modification of the general flow depicted in FIG. 2. In particular, FIG. 3 illustrates a flowchart of an exemplary method for presenting a query plan, generated by the cost-based optimizer 42, to a user, receiving customization instructions from the user, and modifying the access plan in accordance with the customizations. Accordingly, the flowchart starts in step 302 with receiving an SQL statement from a user. There are a variety of ways that an SQL statement, or query, can be provided by a user. This query can be part of a larger job that is automatically generated by an application that produces SQL statements or the query can be provided using an interactive interface, such as a command-line prompt. Similar to the environment of FIG. 2, the query is eventually forwarded through a parser to a cost-based optimizer, in step 304. In response, in step 306, the optimizer will either generate a new access plan, if this query has not been encountered before; or will retrieve a previously generated access plan if a similar query has been previously encountered. Previously generated access plans can be stored in a software-based cache for fast retrieval or can even be stored in more permanent memory in order to be available during different sessions of the database system. Depending on whether the SQL queries are dynamically generated or part of a separate application, the environment can include a number of different caches that store information about previously executed queries and associated access plans.

In step 308, an administrator, or other user, is presented with the access plan that the optimizer anticipates will have the best performance for the query. In one embodiment, the administrator is explicitly queried as to whether he would like to view, and potentially modify, the access plan. In another embodiment, the administrator may automatically be presented with each access plan after it is generated. Alternatively, an administrator's working environment may include a variable or flag that can be set to indicate whether he would like to see each access plan after it is generated but before it is executed. In addition, the access plan may be executed and, then, after execution, the administrator may be asked whether he would like to see, and potentially, modify the access plan. One of ordinary skill will recognize that the query plan from the cost-based optimizer can be presented to an administrator based upon a variety of conditions and at a variety of times before and after execution of the access plan. For example, according to one advantageous embodiment, a tool is provided through which the administrator can view what access plans are available within the environment being administered and select an access plan therefrom. These plans can be stored in a program object with embedded SQL, can be in an SQL package, or can be stored as part of an access plan cache. The administrator is then presented the access plan in such a manner that the administrator can specify a variety of different user preferences in order to edit (or modify) the access plan.

In those instances in which the administrator chooses to modify the access plan, the optimizer receives customization instructions, in step 310, from the administrator. Depending upon the skill-level of the administrator, the optimizer may permit direct modification of the access plan or may accept the modifications as separate information that is associated with the access plan. For less-advanced users, the optimizer can include menus and interface options that allow the user to indirectly indicate what customizations are desired while having the optimizer generate the appropriate modifications to the query plan directives. In step 312, the access plan and its associated customizations are stored together in a temporary cache or more permanent storage. In one embodiment, the access plans generated by the optimizer are instantiated in memory, or more permanent storage media, as objects. In this environment, the associated customizations are stored as part of the related access plan object or are referenced by a pointer within that object. In this way, the customizations, or modifications, are associated with the access plan and stored together.

Some optimizers now have the capability to recognize query signatures when determining whether a query has been encountered before and whether a new access plan needs to be generated. Similar functionality can be used to search through available access plans in order to identify specific plans that match an administrator's search criteria. In this way, an administrator can locate access plans that have particular characteristics.

In step 314, the access plan and its associated modifications, or user preferences, are executed by users within the database environment. For example, in the exemplary object-oriented environment described above, when the particular query is executed, the modifications will be pulled from the object and applied to the query. In some instances, the optimizer will not need to rebuild the access plan to account for the modifications and in other instances, the SQL parser and the optimizer may work together to generate a modified access plan. In this way, when a user causes execution of an access plan, the access plan executes with the benefits provided by the customizations.

There are a number of preferences or modifications that a user may specify for an access plan that will allow customization of the plan for the user. One area of customization is the use of an initialization file. Within many database environments, an initialization file may be present that forces different thresholds and different implementations (e.g., hash, index, join order, etc.) within the execution environment of the database engine. One well-known example of such an initialization file within IBM iSeries™ DB2 environment is the QAQQINI file that permits specifying different setting for controlling remote jobs, force different join orders, set query time limits, control user defined functions, etc. One of ordinary skill will recognize that, in general, an initialization file can also include other environmental variables in addition to what is in this exemplary initialization file. Thus, the initialization file can be configured to help a database work optimally in a given environment. However, as presently implemented, the scope of these initialization files applies to an entire database system or, at least, to an entire job. Thus, settings in the initialization file that may help some queries are applied even to those queries which are not helped (or, possible, even hindered) by these settings. Thus, one customization that a user may specify for the query plan is to identify an initialization file, specific to this query plan, that is different than the current default initialization file set by the system or the job. It becomes possible, therefore, for the user to create a specific initialization file for each query which is customized specifically to assist the performance of that query.

In some instances, the optimization rules do not always result in the most cost-effective access plan being generated. As with all automated systems, there are specific instances and situations where the general rules do not apply. In such instances, a user may have the insight about the particular database environment to know, or at least guess, at what is causing problems for the optimizer. In these, instances, the user may view the access plan and notice one or more alternatives selected by the optimizer that is likely causing the poor performance of the particular access plan. In such instances, the user can use embodiments of the present invention to provide a "hint" to the optimizer. For example, the user may notice that the optimizer is not using a particular index that is available. The user would, in response, modify the access plan to use the particular index. In another instance, the user may know that use of a particular index frequently causes problems and, therefore, the user modifies the access plan to not use that index. In such an instance, the user may simply modify the access plan to avoid the index or can modify the access plan to use a hash algorithm instead of the index, for example, in a "GROUP BY" clause. As discussed previously, the optimizer selects from among a variety of different implementations when building the access plan. These implementation choices involve indexing, ordering, join order, hashing, substituting join types, etc. In accordance with the principles of the present invention, a user can view an access plan and modify the implementations choices made by the cost-based optimizer.

In a robust database system there are hundreds of different query functions with alternative implementation methods that an optimizer chooses from when building a query plan. Even though an exhaustive list of the different functions and their alternative implementation methods are not explicitly included herein, the above-described method contemplates, when appropriate, allowing a user to modify a query plan with alternative implementation methods for any of the wide variety of functions likely to be encountered in a query plan. For example, an ordering function may be implemented using "order by index" or "order by sort"; a grouping function may be implemented using "group by hash" or "group by index"; and a join function may be implemented using either a nested loop method or a hashing method. Additionally, when handling a subquery function, the optimizer may implement it as a "join" or as a separate subquery; or when coding a view function in the query plan, the optimizer can implement the view function using a method known as "materialization" or an alternative method known as "merge". Other exemplary functions include such functions as hash, view, host variables, parameter markers, literals, nested loop, materialization, sort, bit map, sub query, sparse index, merge, and table scan. These are just a few exemplary functions for which an optimizer selects from among alternative implementation methods when generating a query plan.

Another user preference that a user can specify for an access plan is to flag it to prevent the optimizer from rebuilding it. In response to changing conditions within a database environment (e.g., files change size, indices are created or deleted, etc.), a cost-based optimizer will sometimes automatically rebuild a previously generated access plan. This behavior is sometimes beneficial; but, at other times, is unwanted. Accordingly, embodiments of the present invention allow a user to mark, or set a flag, associated with an access plan that this access plan is not to be rebuilt. As a result, an optimizer will check for this flag before rebuilding an access plan.

In accordance with other embodiments of the present invention, there are instances in which a user may want the access plan to remain substantially as it is but, in some instances, for example, slightly modify how it reports a result set. It is common to acquire third-party applications that during execution generate SQL statements which are then, themselves, executed. Often, the source code is not available to modify or the license does not allow modifying the SQL statements that are generated. In these instances, the user may view the resulting access plan and determine that it is desirable to append "clauses" to the SQL statement generated by the application. One of ordinary skill will recognize that there are a wide variety of available SQL clauses to which embodiments of the present invention are applicable. Through the use of an appropriate clause, a user can "order" the output according to different criteria, "group" the output in preferred ways, or can "optimize" for other criteria. Exemplary clauses include SELECT, FROM, WHERE, ORDER, GROUP, OPTIMIZE, FETCH N ROWS, etc. This list of clauses is not meant to limit the present invention as one of ordinary skill will recognize that a variety of other clauses are also available within present and, to be developed, SQL environments.

After specifying such a clause to append to the query, the SQL parser and the query optimizer can merge the original SQL query with the appended clause to generate a new access plan. Similar to appending new clauses to an SQL statement, a user can also identify a clause within the original SQL query to ignore or to over-ride. For example, a user can view the query plan to see that a particular "ORDER BY" clause is part of the access plan. The user can specify that this clause should be ignored; or, alternatively, that the argument of the "ORDER BY" clause should be changed (e.g., change "ORDER BY FIELD1" to "ORDER BY FIELD1, FIELD2"). This approach to modifying an access plan, even if the source code is available, is a less intrusive method to achieve the desired behavior as compared to recompiling the entire application.

Accordingly, a system and method has been described that permits a user to specify a number of user preferences that result in a modification of how a cost-based query plan is executed. This functionality allows user customization of a query plan on a plan-by-plan basis. Various modifications may be made to the illustrated embodiments without departing from the spirit and scope of the invention. Therefore, the invention lies in the claims hereinafter appended.

What is claimed is:

1. A method for associating user preferences with an access plan, the method comprising the steps of:
   generating an access plan for a query using a cost-based optimizer;
   subsequent to generation of the access plan by the cost-based optimizer, receiving one or more user preferences relating to the access plan, wherein the one or more user preferences are separate from the query and received from a user subsequent to generation of the access plan;
   associating the one or more preferences with the access plan;
   storing the access plan and the associated one or more user preferences such that the access plan may be modified prior to execution by applying the one or more user preferences to the access plan;
   executing the access plan to generate a result set, including applying the one or more user preferences to the access plan to modify the access plan prior to execution such that the modified access plan is executed; and,
   wherein the one or more user preferences include an identification of an initialization file specific to the access plan, and wherein applying the one or more user preferences to the access plan includes forcing the initialization file to be used during execution of the access plan in lieu of a default initialization file.

2. A method for associating user preferences with an access plan, the method comprising the steps of:
   generating an access plan for a query using a cost-based optimizer;
   subsequent to generation of the access plan by the cost-based optimizer, receiving one or more user preferences relating to the access plan, wherein the one or more user preferences are separate from the query and received from a user subsequent to generation of the access plan;
   associating the one or more preferences with the access plan;
   storing the access plan and the associated one or more user preferences such that the access plan may be modified prior to execution by applying the one or more user preferences to the access plan;
   executing the access plan to generate a result set, including applying the one or more user preferences to the access plan to modify the access plan prior to execution such that the modified access plan is executed; and,
   wherein the one or more user preferences include an implementation rule, and wherein applying the one or more user preferences to the access plan includes modifying the access plan to implement the implementation rule.

3. The method according to claim 2, wherein the implementation rule relates to using an index.

4. A method for associating user preferences with an access plan, the method comprising the steps of:
   generating an access plan for a query using a cost-based optimizer;
   subsequent to generation of the access plan by the cost-based optimizer, receiving one or more user preferences relating to the access plan, wherein the one or more user preferences are separate from the query and received from a user subsequent to generation of the access plan;
   associating the one or more preferences with the access plan;
   storing the access plan and the associated one or more user preferences such that the access plan may be modified prior to execution by applying the one or more user preferences to the access plan;
   executing the access plan to generate a result set, including applying the one or more user preferences to the access plan to modify the access plan prior to execution such that the modified access plan is executed; and,
   wherein the one or more user preferences include a setting that prevents rebuilding of the access plan, and wherein applying the one or more user preferences to the access plan includes inhibiting the cost-based optimizer from rebuilding the access plan.

5. A method for associating user preferences with an access plan, the method comprising the steps of:
   generating an access plan for a query using a cost-based optimizer;
   subsequent to generation of the access plan by the cost-based optimizer, receiving one or more user preferences relating to the access plan, wherein the one or more user preferences are separate from the query and received from a user subsequent to generation of the access plan;
   associating the one or more preferences with the access plan;
   storing the access plan and the associated one or more user preferences such that the access plan may be modified prior to execution by applying the one or more user preferences to the access plan;
   executing the access plan to generate a result set, including applying the one or more user preferences to the access plan to modify the access plan prior to execution such that the modified access plan is executed; and,
   wherein the one or more user preferences include an additional SQL clause to append to the access plan, and wherein applying the one or more user preferences to the access plan includes merging the query with the additional SQL clause to generate a new access plan and executing the new access plan.

6. The method according to claim 5, wherein the SQL clause is selected from a group consisting of an Order By clause, a Group By clause, and an Optimize clause.

7. A method for associating user preferences with an access plan, the method comprising the steps of:
   generating an access plan for a query using a cost-based optimizer;
   subsequent to generation of the access plan by the cost-based optimizer, receiving one or more user preferences relating to the access plan, wherein the one or more user preferences are separate from the query and received from a user subsequent to generation of the access plan;
   associating the one or more preferences with the access plan;

storing the access plan and the associated one or more user preferences such that the access plan may be modified prior to execution by applying the one or more user preferences to the access plan;

executing the access plan to generate a result set, including applying the one or more user preferences to the access plan to modify the access plan prior to execution such that the modified access plan is executed; and, wherein the one or more user preferences identify a SQL clause in the access plan and a change to the SQL clause, wherein applying the one or more user preferences to the access plan includes modifying the query based upon the change to the SQL clause to generate a new access plan and executing the new access plan.

8. The method according to claim 7, wherein the change indicates ignoring the SQL clause.

9. The method according to claim 7, wherein the change indicates revising one or more parameters of the SQL clause.

* * * * *